United States Patent
Hirao et al.

(10) Patent No.: US 6,553,144 B1
(45) Date of Patent: Apr. 22, 2003

(54) CODING METHOD AND CODING APPARATUS FOR BI-LEVEL DOCUMENT IMAGE

(75) Inventors: Kouichirou Hirao, Tokyo (JP); Takahiro Hongu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/348,455

(22) Filed: Jul. 7, 1999

(30) Foreign Application Priority Data

Jul. 7, 1998 (JP) .......................................... 10-191385

(51) Int. Cl.[7] ................................................. G06K 9/36
(52) U.S. Cl. ........................................ 382/239; 382/247
(58) Field of Search ................................. 382/239, 245, 382/232, 238, 247, 248, 233; 358/1.9; 341/107

(56) References Cited

U.S. PATENT DOCUMENTS 5,960,117 A * 9/1999 Hiratani ....................... 382/239

FOREIGN PATENT DOCUMENTS

| EP | 10093828 A | 10/1998 | .......... H04N/1/417 |
| EP | 97 317 A2 | 12/2000 | ............. G06T/9/00 |
| JP | 5-298063 | 11/1993 | ............. G06F/5/00 |
| JP | 6/86079 | 3/1994 | ............ H04N/1/411 |
| JP | 8-116534 | 5/1996 | ............. H04N/7/24 |

OTHER PUBLICATIONS

Paul J. Ausbeck Jr.: "A streaming piecewise–constant model" Proceedings Data Compression Conference, Mar. 29–31, 1999, pp. 208–217, XP002195328 Los Alamitos, California.

Whoi–Yul Kim: "The ISO JPEG and JBIG Still Image–Coding Standards Section 2 the JBIG Standard" Digital Consumer Electronics Handbook, McGraw–Hill, 1997, pp. 911–924, I–II, IX–X, XP001059409

* cited by examiner

*Primary Examiner*—Wenpeng Chen
(74) *Attorney, Agent, or Firm*—Foley & Lardner (57) ABSTRACT

A coding method and a coding apparatus for bi-level document image which makes a high speed coding processing possible is provided. In the coding apparatus, an image reading processing section provides an image data reading means which reads bi-level image data from a RAM, a CX generating means which generates CX using image data in a line memory and a CX counting means which counts the number of appearance times of CX based on the CX generated by the CX generating means and the inputted bi-level image data. In the coding apparatus, a coding processing section provides a coding processing deciding means which decides to implement either of two kinds of coding processing, a normal coding means which implements a normal coding processing implementing a conventional JBIG algorithm and a high speed coding means which implements a high speed coding processing using the counted values. With this, at the case of the image having a large amount of white areas such as a bi-level document image, the efficiency of the coding processing is improved and as a result the high speed coding processing can be realized.

11 Claims, 7 Drawing Sheets

CODING METHOD AND CODING APPARATUS FOR BI-LEVEL DOCUMENT IMAGE

BACKGROUND OF THE INVENTION

The present invention relates to a coding method and a coding apparatus for bi-level document image which implements the coding of white pixels sequentially existing in an image together and reduces the number of processing steps and realizes a high speed coding processing, at the case that the coding of bi-level document image is implemented, in particular at the JBIG (Joint Bi-level Image Coding Experts Group) system recommended by the T.82 and T.85 of the ITU-T (International Telecommunication Union).

DESCRIPTION OF THE RELATED ART

A conventional coding method and coding apparatus for bi-level document image implements the coding of bi-level document image applying the JBIG system recommended by the T.82 and T.85 of the ITUT. The JBIG system, which is a coding algorithm for bi-level document image by the recommendation of the T.82 and T.85 of the ITU-T, predicts a pixel in a unit of one pixel and implements the coding processing. At the prediction of the pixel, surrounding pixels called model template are used as referring pixels.

Figure 1:
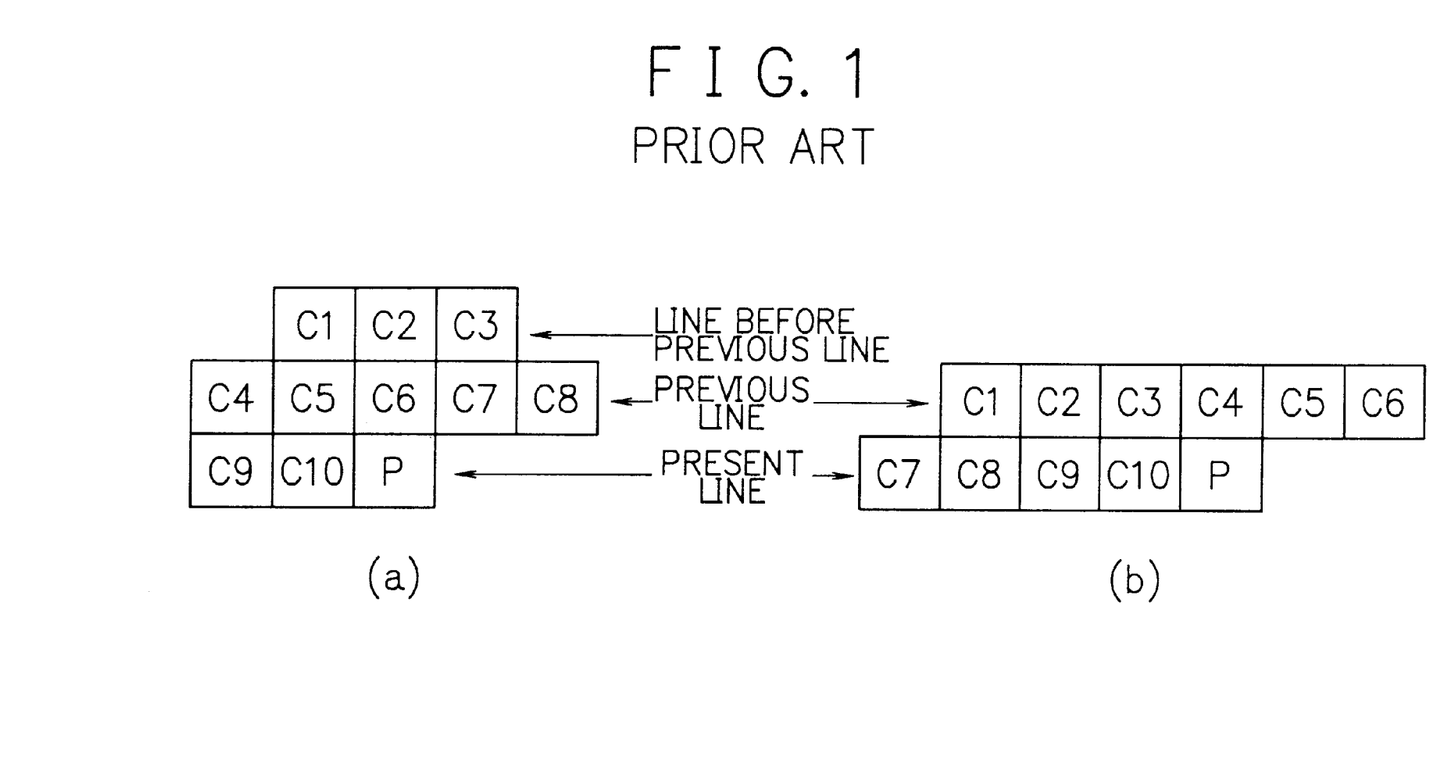
FIG. 1 is a model template diagram showing a conventional model template for the lowest resolution layer of the JBIG system.

FIG. 1 is a model template diagram showing the conventional model template for the lowest resolution layer of the JBIG system. As model templates, there are a templates of three lines shown in FIG. 1(a) and a template of two lines shown in FIG. 1(b). In FIG. 1, P is a pixel to be coded and decoded and ten pixels C1 to C10 are referring pixels. The appearance probability of the pixel P is calculated by the combination of the pixel values of these C1 to C10, and the coding and decoding processing is implemented.

Figure 2:
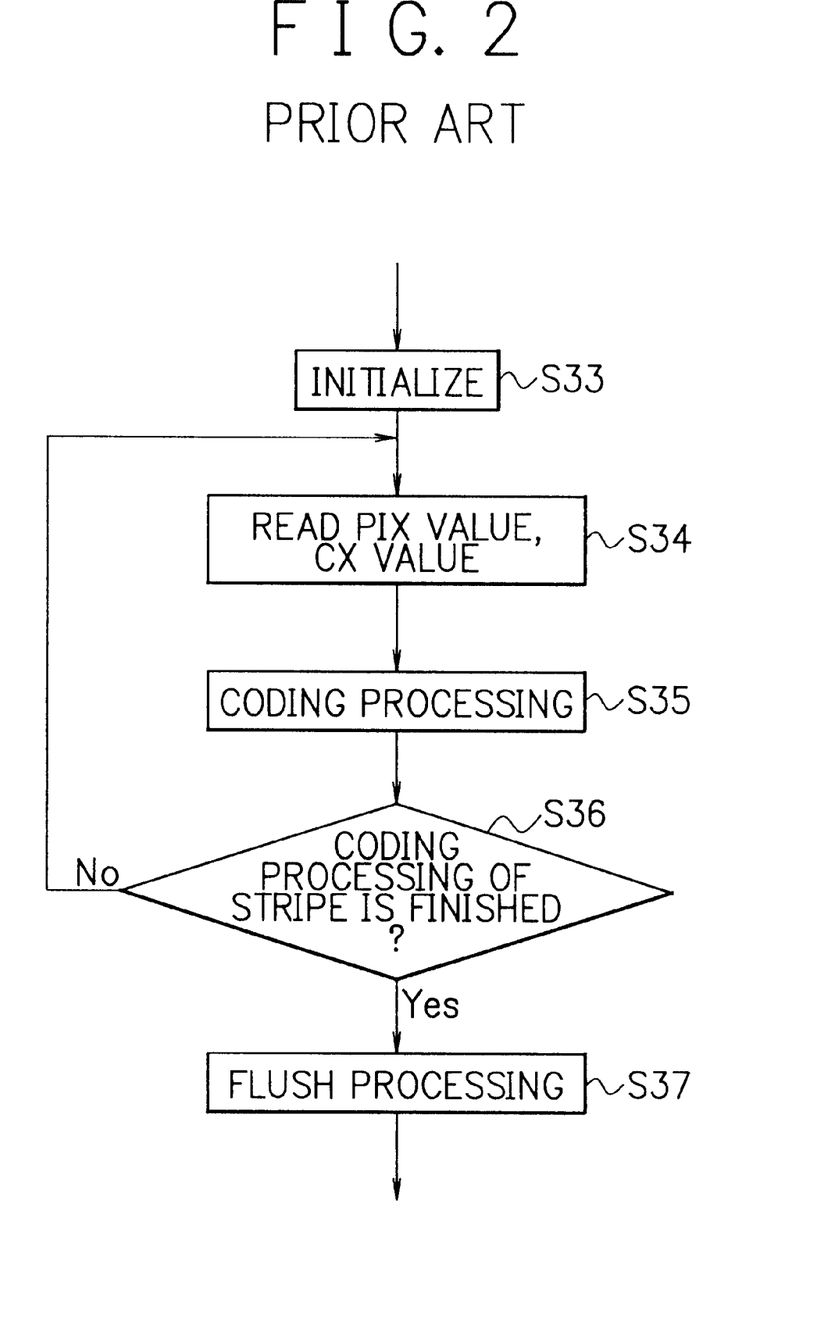
FIG. 2 is a flowchart showing a conventional coding processing by the JBIG system.

FIG. 2 is a flowchart showing a conventional coding processing by the JBIG system. First, each parameter is initialized (step S33). After this, a pixel value to be coded (hereinafter referred to as PIX) and context value (hereinafter referred to as CX) expressing the state of the model template at the time are read (step S34). The coding of PIX is implemented using the read PIX and CX (step S35). The processes of step S34 and step S35 are continued until the stripe is finished (step S36). In this, the stripe means a processing unit at the JBIG system, and one page of the image is divided to stripes and is processed at the JBIG system. After the coding processing of the stripe is finished, a FLUSH processing is implemented in order that the codes remaining in a register and a buffer are taken out (step S37).

Figure 3:
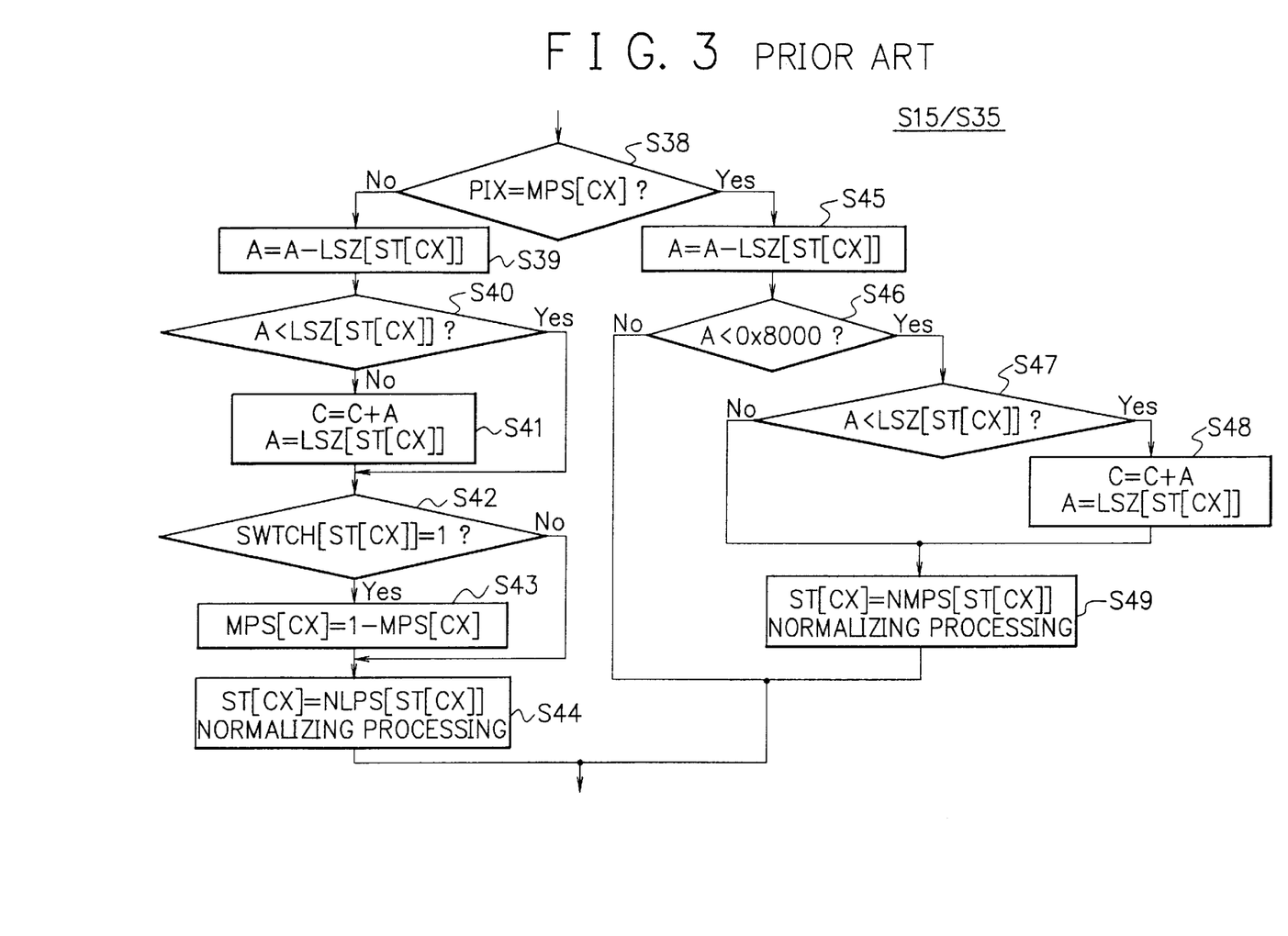
FIG. 3 is a flowchart showing the conventional coding processing shown at the step S35 in FIG. 2 in detail.

FIG. 3 is a flowchart showing the conventional coding processing shown at the step S35 in FIG. 2 in detail. First, the present PIX value to be coded is compared with a MPS (more probable symbol) value corresponding to the CX at that time (step S38) and it is determined that the PIX is the MPS or a LPS (less probable symbol).

At the step S38, at the case that the PIX is the LPS, for the value of an A register expressing the probability area width, the subtraction of the appearance probability of the LPS (hereinafter referred to as LSZ) from A is implemented and the subtracted result is substituted (step S39). Next, the calculated value of the A register is compared with the LSZ (step S40) and at the case that A≧LSZ (No of step S40), the addition of a C register being a code generating register and the A register is implemented, and after this, the LSZ is substituted for the A register (step S41). At the step S40, at the case that A<LSZ (Yes of step S40) and after the step S41 of the case that A≧LSZ, the value of a SWTCH is examined and at the case that the SWTCH=1 (Yes of step S42), the value of the MPS is made inverse (step S43). Last, for the value of a status (hereinafter referred to as ST) expressing the state of the CX, a NLPS (next less probable symbol) expressing a status of a next estimating position at the time of the LPS is substituted and a normalizing processing is implemented (step S44) and the coding processing of the PIX is finished.

The probability estimation table is described in the recommendation of the T.82 of the ITU-T. The table is composed of the value of the LSZ corresponding to each ST, the value of ST of the next estimating position NLPS at the case that the PIX at the time is judged to be the LPS, the value of ST of the next estimating position NMPS (next more probable symbol) at the case that the PIX at the time is judged to be the MPS and the SWTCH which decide whether the value of the MSP which the CX has at that time is made inverse or not.

At the step S38, at the case that the PIX is judged to be the MPS, first, at the same as the time of the LPS, the LSZ is subtracted from the value of the A register (step S45). The subtracted A value is compared with whether the A value is smaller than the value 0x8000 (step S46). At the case that A≧0x8000, i.e., 8000 hexadecimal, No of step S46, the coding processing of the PIX is finished without any processes. At the case that A<0x800, Yes of step S46), the value of the A register is compared with the value of the LSZ (step S47), at the case that A<LSZ (Yes of S47), the addition of the value of the C register and the value of the A register is implemented and the LSZ is substituted for the A register (step S48). Last, the NMPS is substituted for the ST and the normalizing processing is implemented (step S49) and the coding processing of the PIX is finished.

Japanese Patent Application Laid-Open No. HEI 5-298063 discloses a coding apparatus. This apparatus calculates the value of the MPS of each context and sets the calculated result as the initial value of the MPS to a coding section and a decoding section, by using plural documents to be coded or a document representative of documents to be decoded beforehand. And this apparatus also designates the number of the initial state of each context corresponding to the appearance probability of the LPS in each context. And a probability estimation section reduces the learning steps required to select the most suitable probability area width corresponding to the appearance probability of the LPS and MPS at each context. With this, without adding the changes for the construction of the known adaptive bi-level arithmetic coding apparatus, the improvement of the compression rate and coding efficiency of the document composed of letters can be realized by this apparatus.

However, recently the communication speed has become faster and the amount of the transmitting image data has increased and the resolution of pixels has also increased, as a result the further improvement at the image data processing speed has been required. For example, at the algorithm by the JBIG system, the processing is implemented for every pixel in images, therefore a certain number of processing steps are required for each pixel. At the case that this processing is realized by software, the processing speed is decreased, compared with the realization by hardware. Even the image of 200 dpi of the paper size A4 (about 210 mm×295 mm) has about 4 million pixels and the processing time for this image becomes huge.

Moreover, a high speed MODEM (modulator-demodulator) has been recently applied for a facsimile apparatus and the communication speed has become short, therefore the high speed processing has been also required for the coding processing. In particular, at the JBIG system with high compression rate, the communication time is short, therefore the coding processing time of some CPU (central processing unit) can not meet the communication speed. Even at the case that the CPU can meet the communication speed, the CPU must mainly operate this coding processing, there is a problem that the other operation can not be processed.

SUMMARY OF THE INVENTION

It is therefore an object of the present invention to provide a coding method and a coding apparatus for bi-level document image that can realize a further high speed coding processing, at the JBIG system.

According to a first aspect of the present invention, for achieving the mentioned above objects, there is provided a coding method for bi-level document image including a reading process for reading a document as image data, a checking process for checking sequential values of the image data read by said reading process, a coding processing process which implements the coding processing for the sequential same values from said sequential values checked by said checking process together at one time and a controlling process for controlling to make said reading process and said coding processing process implement every stripe, and implementing a high speed coding processing for document image data having a large amount of white areas, by the coding processing which implements the coding processing for said sequential same values together at one time.

According to a second aspect of the present invention, in the first aspect, said coding processing process implements the coding processing for the sequential same values from said sequential values checked by said checking process together at one time and implements a high speed coding processing for document image data having a large amount of white areas, at the JBIG system.

According to a third aspect of the present invention, in the second aspect, the coding processing at said coding processing process is mainly implemented for the document image data of white areas of "0" value.

According to a fourth aspect of the present invention, in the first aspect, said coding processing process is constructed as a switch-able structure of said high speed coding processing and a normal coding processing.

According to a fifth aspect of the present invention, in the fourth aspect, a coding method for bi-level document image provides a coding processing deciding process for deciding to implement the coding processing by either said high speed coding processing or said normal coding processing based on the result of said checking process.

According to a sixth aspect of the present invention, there is provided a coding apparatus for bi-level document image that provides an image reading processing section, a coding processing section, a RAM, a line memory and an image inputting equipment. In this apparatus, said image reading processing section provides an image data reading means for reading bi-level document image data from said RAM, a storing means for making said bi-level document image data of previous line and the line before previous line read by said image data reading means store in said line memory, a CX generating means for generating CX using said bi-level document image data stored in said line memory by said storing means and a CX counting means for counting the number of appearance times of CX based on said CX generated by said CX generating means and the values of said bi-level document image data stored by said storing means. In this apparatus, said coding processing section provides a normal coding means for implementing coding by a normal JBIG algorithm, a high speed coding means for implementing coding by using the values of CX counted by said CX counting means in high speed and a coding processing deciding means for deciding to use either coding processing of said normal coding means or said high speed coding means. Said coding apparatus for bi-level document image detects sequential white areas existing in said bi-level document image data and makes the high speed coding processing for the bi-level document image data having a large amount of white areas possible.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 4:
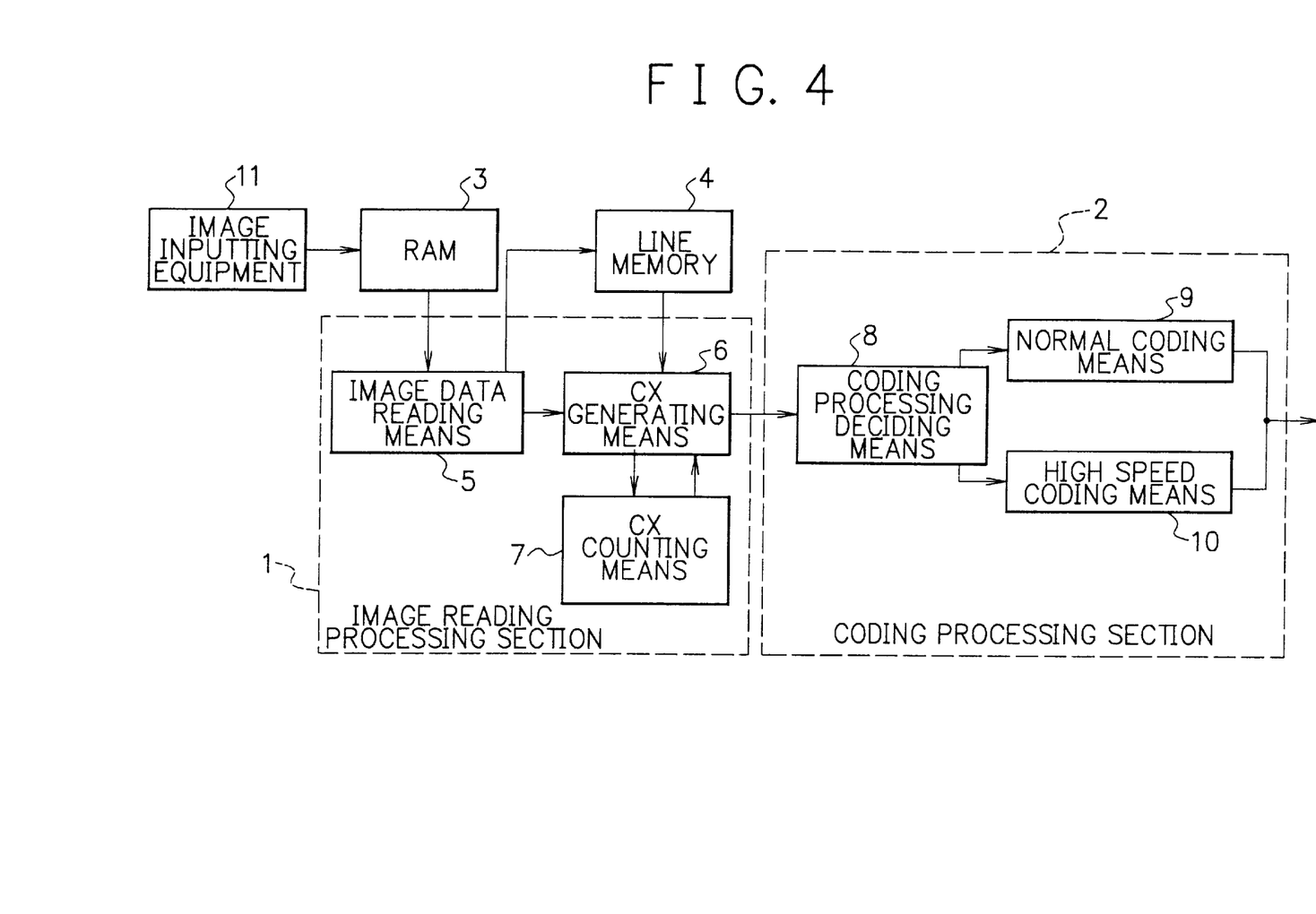
FIG. 4 is a block diagram showing an embodiment of the construction of the present invention.

Referring now to the drawings, an embodiment of a coding method and a coding apparatus for bi-level document image of the present invention is explained in detail. In FIGS. 4 to 8, the embodiment of the present invention is shown. FIG. 4 is a block diagram showing an embodiment of the construction of the present invention. FIGS. 5 to 8 are flowcharts showing the processing steps of the present invention. In the explanation, the conventional processing steps shown in FIG. 3 is also used.

The coding apparatus shown in FIG. 4 includes an image reading processing section 1, a coding processing section 2, a RAM 3, a line memory 4 and an image inputting equipment 11 being such as a scanner.

The image reading processing section 1 provides an image data reading means 5 which reads bi-level image data from the RAM 3, a CX generating means 6 which generates CX used the image data from the line memory 4, (CX is a context expressing a state of a model template at the time to be coded) and a CX counting means 7 which counts the number of appearances of the CX corresponding to the value of the generated CX and the value of the inputted bi-level image data.

The coding processing section 2 provides a normal coding means 9 which implements the coding by the conventional JBIG algorithm, a high speed coding means 10 which implements the high speed coding using the counted CX value and a coding processing deciding means 8 which decides to implement either the normal coding means 9 or the high speed coding means 10.

The RAM 3 memorizes the image data inputted from the image inputting equipment 11 and the line memory 4 memorizes the image data of the previous line and the line before the previous line.

Figure 5:
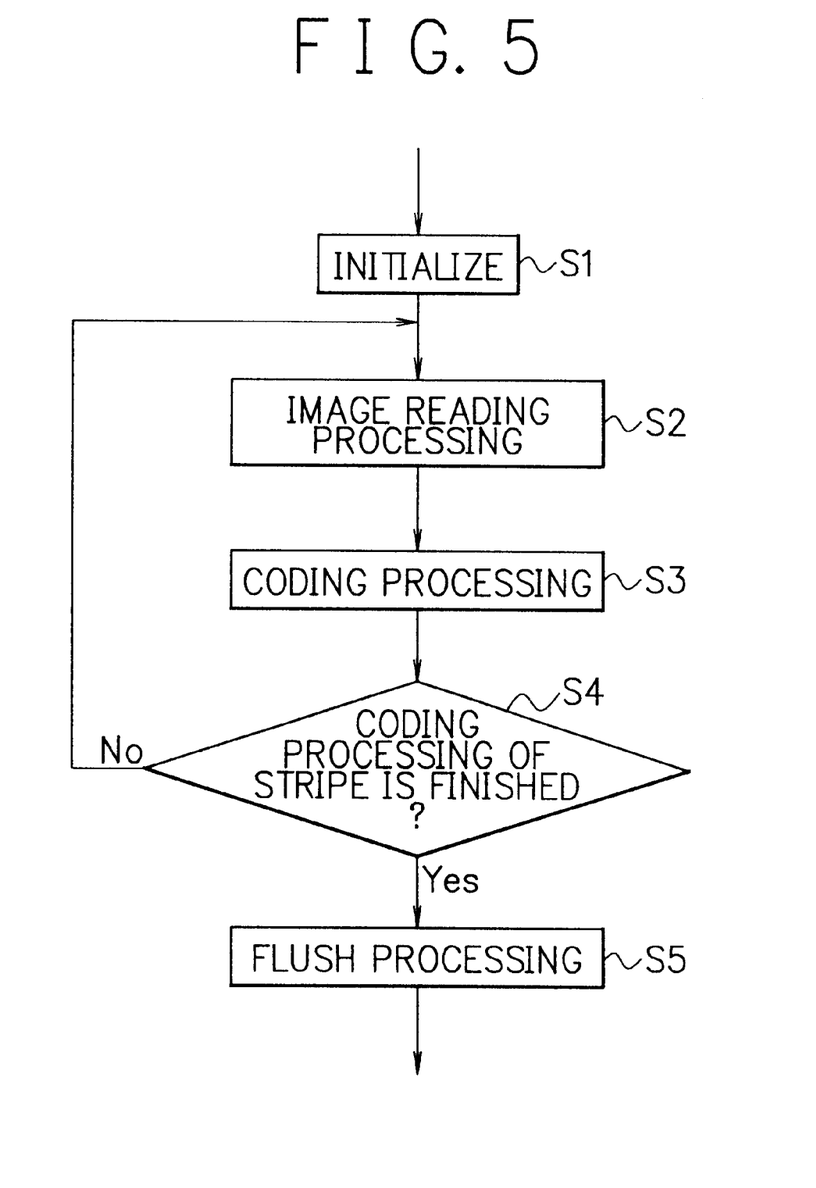
FIG. 5 is a flowchart showing an example of processing steps of the coding method and the coding apparatus for the bi-level document image of the present invention.
Figure 6:
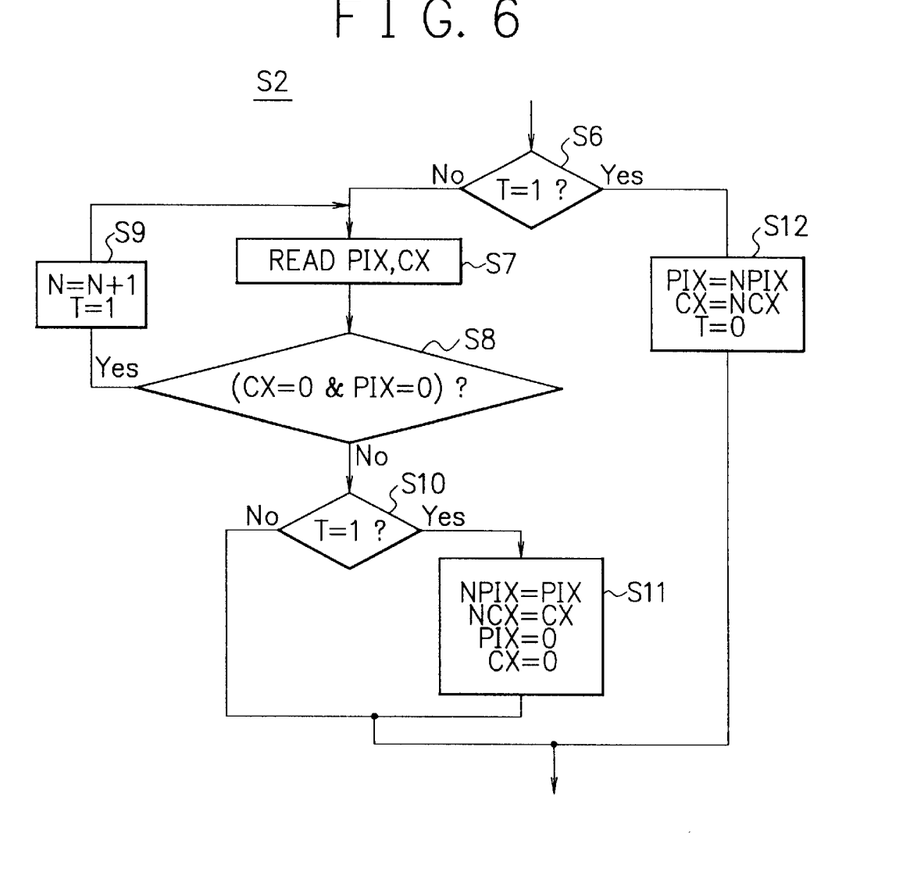
FIG. 6 is a flowchart showing an image reading processing of the present invention.
Figure 7:
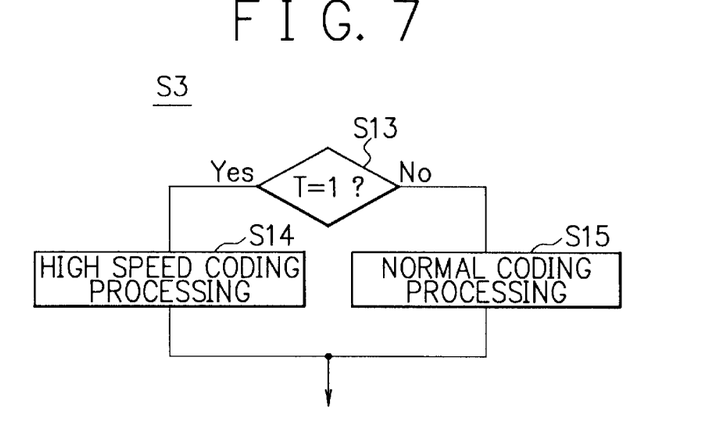
FIG. 7 is a flowchart showing a coding processing of the present invention.
Figure 8:
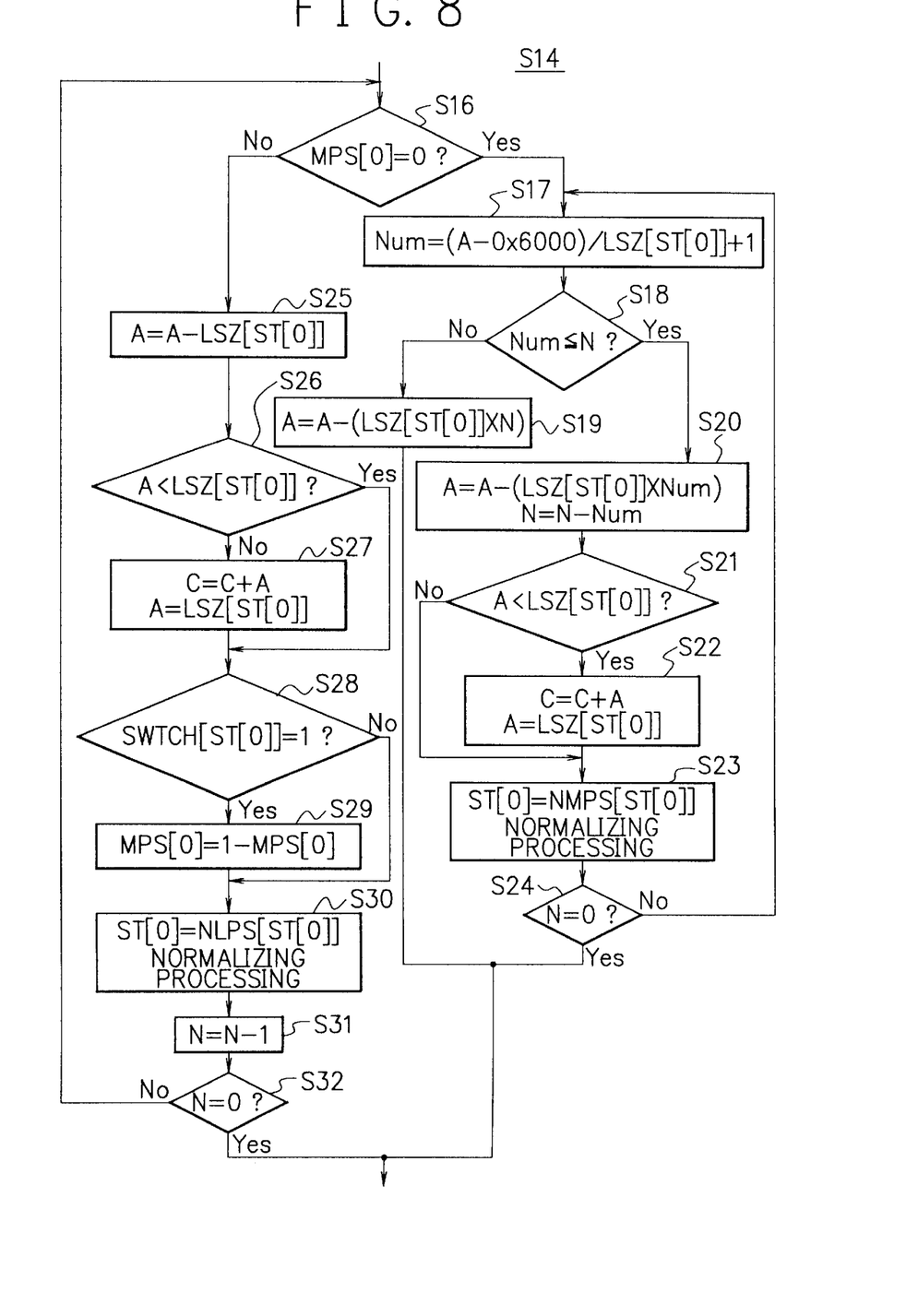
FIG. 8 is a flowchart showing a high speed coding processing of the present invention.

Next, an example of processing steps of the coding apparatus shown in FIG. 4 is explained using flowcharts shown in FIGS. 5, 6, 7 and 8. FIG. 5 is a flowchart showing an example of processing steps of the coding method and the coding apparatus for the bi-level document image of the present invention. FIG. 6 is a flowchart showing an image reading processing of the present invention. FIG. 7 is a flowchart showing a coding processing of the present invention. FIG. 8 is a flowchart showing a high speed coding processing of the present invention. FIGS. 6 to 8 show the processing steps shown in FIG. 5 in detail.

In FIG. 5, first each parameter is initialized (step S1). At this step S1, in addition to the setting of parameters by the conventional JBIG system, the value of N and T are set to "0". In this, N means the number of times sequentially generated both CX=0 and PIX=0, and T is a flag showing whether the high speed coding processing is implemented or not, and T=1 means the high speed coding processing. Next, an image reading processing is implemented (step S2) and a coding processing is implemented using the read the values of PIX and CX and the value of N (step S3). The image reading processing at the step S2 and the coding processing at the step S3 are continued until the coding processing of the stripe is finished (step S4). In this, the stripe means the coding processing unit at the JBIG system and generally the image of one page is divided into stripes and is coded. After the coding processing of the stripe is finished, a FLUSH processing which takes out the remaining codes is implemented (step S5) and the coding of one stripe is finished.

In FIG. 6, the image reading processing at the step S2 shown in FIG. 5 is explained in detail. At FIG. 6, first the judgement whether T=1 or not is implemented (step S6). At the case that T=0 (No of step S6), the PIX and CX are read (step S7). At the case that both CX=0 and PIX=0(Yes of S8), T=1 and N=N+1 are set (step S9) and again PIX and CX are read. The loop of the steps S7, S8 and S9 is implemented until the CX of CX≠0 or the PIX of PIX≠0 is generated.

Next, again the judgement of T=1 is implemented (step S10). At the case that the processing passed through the above mentioned loop through the step S9, the read PIX and CX are substituted for NPIX (next pixel value) and NCX (next context value) respectively and the values of PIX and CX are set to "0" (step S11) and the processing goes to the next coding processing. At the case that the processing did not pass through the above mentioned loop through the step S9, that is, the case that the CX and PIX being both CX=0 and PIX=0 were not appeared, the values of the PIX and CX remain as the read values and the processing goes to the next coding processing. The meaning of T=1 at the step S10 is that the high speed coding processing will be implemented at the next coding processing. In this case, the latest read values of PIX and CX are not both CX=0 and PIX 0, and are made to be standby temporarily.

At the case that the judgement at the step S6 being the first step of the image reading processing is T=1, the NPIX and NCX are substituted for the PIX and CX respectively and T=0 is set (step S12), and the processing goes to the next step. The meaning of T=1 at the step S6 is that the high speed coding processing was implemented at the previous coding processing. In this case, the values of PIX and CX made to be standby temporarily are returned and the coding processing of the PIX is implemented.

In FIG. 7, the coding processing at the step S3 shown in FIG. 5 is explained in detail. At FIG. 7, at the case that the step S13 is T=1, the high speed coding processing is implemented (step S14), at the case that the step S13 is T=0, the conventional normal coding processing is implemented (step S15). FIG. 8 shows the flowchart of the high speed coding processing and FIG. 3 shows the flowchart of the conventional normal coding processing.

At the high speed coding processing in FIG. 8, the judgement whether the value of MPS at the time of CX=0 is 0 or not is implemented (step S16). At the case that MPS [0]=0, that is, MPS=0 at CX=0 (Yes of step S16), the value of Num is calculated (step S17). In this, the Num means the maximum times of subtraction until the normalizing processing is generated. The value of Num calculated at the step S17 is compared with the value of N (step S18). In this, N means the number of times sequentially generated both CX=0 and PIX=0. At the case that Num>N (No of step S18), the value of LSZ of N times is subtracted from the value of A register (step S19). That is, the times of subtraction until the normalizing process is generated is larger than the number of times generated the data being both CX=0 and PIX=0, N pieces of data are coded together at one time. At the case that Num≦N (Yes of step S18), N pieces of data can not be processed together at one time, therefore firstly Num pieces of data are processed together, and N=N−Num is calculated and the remaining number of processing times is calculated (step S20). Then, A register is compared with LSZ (step S21), at the case that A<LSZ, A register is added to C register and LSZ is substituted for A register (step S22). After this, ST=NLPS and the normalizing process are implemented (step S23). Finally, the judgement whether N=0 or not is implemented (step S24), at the case that N≠0, the processing returns to the step S17 again and the same processing is repeated.

At the case that MPS=1 at the step S16 in FIG. 8, the similar processing (steps S25 to S30 in FIG. 8) to the conventional coding processing at the time of LPS (steps S39 to S44 in FIG. 3) is implemented. After the normalizing processing at the step S30 is finished, the subtraction processing of the value of N, that is N=N−1, is implemented (step S31), after this the judgement whether N=0 or not is implemented (step S32). In this, at the case that N≠0, the processing returns to the step S16 again and the same processing is repeated and the processing is continued until N=0. At the step S29, at the case that the inverse MPS is implemented, at the time when the processing is returned to the step S32, next the processing of the case of MPS is implemented.

The mentioned above processing is a coding algorithm of the present invention and a decoding processing can be easily realized by the implementation of the similar processing. Moreover, the present invention can be realized not only by software but also by hardware.

The advantage of the embodiment of the present invention is that a high speed coding processing can be realized for an image having relatively a large amount of white pixels such as a bi-level document image. As a result, at the case that the ITU-T No. 1 document is processed by a 64 bits RISC (reduced instruction set computer) CPU, about 70% of the CPU is occupied by the conventional coding processing.

However the present invention can reduce the occupation ratio of the CPU to about less than 20% and can decrease the load to the CPU.

In the bi-level document image, relatively a large amount of white pixels exist, therefore the pattern being both CX=0 and PIX=0 is generated frequently and sequentially. At the case that CX=0, almost all the values of MPS [0] are 0, therefore at the time when both CX=0 and PIX=0, the processing of the time of MPS is implemented at the JBIG algorithm. This processing at the time of MPS is only the subtraction that the value of LSZ is subtracted from the value of A register, therefore if it is satisfied that the subtracted result is A≧0x8000, the status estimating of ST and the normalizing processing are not implemented. Therefore, at the case that N is defined as the number of the sequentially generated times of both CX=0 and PIX=0 and Num is defined as the maximum times that the LSZ can be subtracted from the A register, N pieces of pixels at the time of N≧Num and Num pieces of pixels at the time of N>Num can be processed at one time.

The equation is $$A=A-(LSZ \times N)$$

or, $$A=A-(LSZ \times Num).$$

In this, after Num pieces of pixels are processed, the (N−Num) pieces of pixels remain, at this time after the operation of C register, the status estimating of ST and the normalizing processing are implemented, again the calculation of Num is implemented by using the value of normalized A register and the processing is implemented as together as possible. This processing is implemented until N=0. As a result, conventionally the processing was implemented every pixel. However the present invention can process at one time, therefore the processing steps can be reduced and the present invention can realize the high speed processing.

In the mentioned above embodiment, for example at FIG. 6, at the case that the read PIX and CX (step S7) are both CX=0 and PIX=0, the coding processing of PIX is not started and the number of sequentially generated times of both CX=0 and PIX=0 is counted (steps S8 and S9). After this, at the time when the data of CX≠0 or PIX≠0 is generated, the PIX values counted before are coded. The coding processing is shown in FIG. 8 in detail.

At the step S17 in FIG. 8, Num being the maximum subtraction times which can be operated together at one time is calculated, and the calculated Num is compared with the counted N, and the coding processing of N pieces or Num pieces of pixels is implemented at one time. With this, at the image having a large amount of white pixels such as the bi-level document image, the processing efficiency of coding is improved and as a result the high speed coding processing can be realized.

At the case that the No. 1 document of the ITU-T is processed, the number of passed times of the processing route through which the processing of N pieces of pixels is implemented is 11,919 times and the number of pixels processed at this processing route is 633,694 pixels and consequently the average pixels processed every one passing is 53 pixels. And the number of passed times of the processing route through which the processing of Num pieces of pixels is implemented is 4,333 times and the number of pixels processed at this processing route is 1,055,394 pixels and consequently the average pixels processed every one passing is 243 pixels. As a result, at the 64 bits RISC CPU, compared with the conventional coding processing, more than 4 times of high speed coding processing can be realized at the present invention.

The above mentioned embodiment is a suitable example of the present invention. And the present invention is not limited to this embodiment and is usable for various applications without departing the spirit of the present invention.

As it is clear from the mentioned above explanation, according to the coding method and cording apparatus for bi-level document image of the present invention, the sequential "0" or "1" of the read image data is examined and the coding processing for the plural pixels of examined result is implemented. With this, at the case of the image having a large amount of white pixels such as the bi-level document image, the coding processing efficiency is improved and as a result the high speed coding processing can be realized.

While the present invention has been described with reference to the particular illustrative embodiments, it is not to be restricted by this embodiment but only by the appended claims. It is to be appreciated that those skilled in the art can change or modify the embodiment without departing from the scope and spirit of the present invention.

What is claimed is:

1. A coding method for a bi-level document image, comprising:
   a reading process for reading a document as image data;
   a checking process for checking sequential values of the image data read by said reading process;
   a coding processing process which implements coding processing for sequential same values from said sequential values checked by said checking process together at one time; and
   a controlling process for controlling said reading process and said coding processing process to implement every stripe,
   and for implementing a high speed coding processing using context values, in the coding processing process, for document image data having a large amount of white areas.

2. A coding method for bi-level document image in accordance with claim 1, wherein:
   said coding processing process implements the coding processing for the sequential same values from said sequential values checked by said checking process together at one time and implements a high speed coding processing for document image data having a large amount of white areas, at the JBIG system.

3. A coding method for bi-level document image in accordance with claim 2, wherein:
   the coding processing at said coding processing process is mainly implemented for the document image data of white areas of "0" value.

4. A coding method for bi-level document image in accordance with claim 1, wherein:
   said coding processing process is constructed as a switchable structure of said high speed coding processing and a normal coding processing.

5. A coding method for bi-level document image in accordance with claim 4, comprising:
   a coding processing deciding process for deciding to implement the coding processing by either said high speed coding processing or said normal coding processing based on the result of said checking process.

6. A coding apparatus for bi-level document image which provides an image reading processing section, a coding processing section, a RAM, a line memory and an image inputting equipment, wherein:

said image reading processing section, comprising:
an image data reading means for reading bi-level document image data from said RAM;
a storing means for making said bi-level document image data of previous line and the line before previous line read by said image data reading means store in said line memory;
a context value generating means for generating a context value using said bi-level document image data stored in said line memory by said storing means; and
a context value counting means for counting the number of appearance times of a context value based on said the context value generated by said context value generating means and the values of said bi-level document image data stored by said storing means, said coding processing section, comprising:
a normal coding means for implementing coding by a normal JBIG algorithm;
a high speed coding means for implementing coding by using the values of the context value counted by said context value counting means in high speed; and
a coding processing deciding means for deciding to use either coding processing of said normal coding means or said high speed coding means,
wherein said coding apparatus for bi-level document image detects sequential white areas existing in said bi-level document image data and codes a large amount of said sequential white areas using said high speed coding means.

7. A coding apparatus for a bi-level document image comprising:
an image data reading means for reading bi-level document image data from a first memory;
a storing means for storing a first line of said bi-level document image data and a second line of bi-level document image data in a second memory;
a context value generating means for generating a context value using said bi-level document image data stored in said second memory
a context value counting means for counting the number of context values generated by said context value generating means and the values of said bi-level document image data stored by said storing means,
a normal coding means for implementing coding by a normal JBIG algorithm;
a high speed coding means for implementing-coding by using the context values counted by said context value counting means; and
a coding-processing deciding means for deciding to use either said normal coding means or said high speed coding means,
wherein said coding apparatus detects sequential white areas existing in said bi-level document image data and codes said sequential white areas using said high speed coding means.

8. The coding apparatus of claim 7, wherein the first memory is a RAM.

9. The coding apparatus of claim 7, wherein the first line of bi-level document image data is a line of bi-level document image data previous to a present line of bi-level document image data to be coded and the second line of bi-level document image data is a line of bi-level document image data previous to the first line of bi-level document image data.

10. The coding apparatus of claim 7, wherein the first line of bi-level document image data and the second line of bi-level document image data are read by the image data reading means.

11. A method of coding a bi-level document image comprising:
reading bi-level document image data from a first memory;
storing a first line of bi-level document image data and a second line of bi-level document image data in a second memory;
generating a context value using said bi-level document image data stored in said second memory;
counting a number of context values generated;
counting values of said bi-level document image data;
implementing coding by a normal JBIG algorithm;
implementing coding by using said context values counted;
detecting sequential white areas existing in said bi-level document image data; and
deciding to use coding by said normal JBIG algorithm or coding by said context values counted,
wherein said sequential white areas existing in said bi-level document image data are coded by said context values counted.

* * * * *